US009294591B2

(12) United States Patent
Naidu et al.

(10) Patent No.: US 9,294,591 B2
(45) Date of Patent: *Mar. 22, 2016

(54) APPARATUS AND METHODS FOR FLEXIBLE COMMUNICATIONS IN A NETWORK

(71) Applicant: AT&T Intellectual Property I, LP, Atlanta, GA (US)

(72) Inventors: Lakshminarashimhan Naidu, Pearland, TX (US); Bernard Ku, Austin, TX (US); Saji Varughese, Austin, TX (US)

(73) Assignee: AT&T Intellectual Property I, IP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,211

(22) Filed: Mar. 20, 2015

(65) Prior Publication Data

US 2015/0215437 A1 Jul. 30, 2015

Related U.S. Application Data

(63) Continuation of application No. 13/493,521, filed on Jun. 11, 2012, now Pat. No. 9,015,327.

(51) Int. Cl.
*H04L 29/06* (2006.01)
*H04L 29/12* (2006.01)
*G06F 15/16* (2006.01)

(52) U.S. Cl.
CPC ........ *H04L 69/167* (2013.01); *H04L 29/06197* (2013.01); *H04L 29/12971* (2013.01); *H04L 61/1511* (2013.01); *H04L 65/1006* (2013.01); *H04L 65/1016* (2013.01); *H04L 65/1069* (2013.01); *H04L 67/42* (2013.01); *H04L 61/6059* (2013.01)

(58) Field of Classification Search
CPC ............ H04L 65/1016; H04L 65/1006; H04L 65/1069; H04L 29/06197; H04L 29/12971; H04L 67/42; H04L 61/6059; H04L 61/167
See application file for complete search history.

(56) References Cited

U.S. PATENT DOCUMENTS 6,839,421 B2   1/2005   Ferraro Esparza et al.
7,274,683 B2   9/2007   Segal
(Continued)

OTHER PUBLICATIONS

Microsoft "How DNS query works", http://technet.microsoft.com/en-us/library/cc775637(d=printer,v=ws.10).aspx, Jan. 21, 2005.
(Continued)

*Primary Examiner* — Larry Donaghue
(74) *Attorney, Agent, or Firm* — Guntin & Gust, PLC; Douglas Schnabel (57) ABSTRACT

A method that incorporates teachings of the subject disclosure may include, for example, transmitting a first query to a domain naming server responsive to receiving a session initiation protocol message comprising a fully qualified domain name. The first query can include one of an internet protocol version 4 address query or an internet protocol version 6 address query associated with the fully qualified domain name. The method can include receiving at least one answer from the domain naming server. The at least one answer can include at least one of an internet protocol version 4 address having no errors, a second internet protocol version 6 address having no errors, or both. The method can also include transmitting a message to a communication device. The message can include information associated with the at least one answer.

20 Claims, 7 Drawing Sheets

(56) References Cited

U.S. PATENT DOCUMENTS

| | | | |
|---|---|---|---|
| 7,277,421 | B1 | 10/2007 | Pershan |
| 7,328,281 | B2 | 2/2008 | Takeda et al. |
| 7,394,804 | B2 | 7/2008 | Miyata et al. |
| 7,502,923 | B2 | 3/2009 | Poyhonen et al. |
| 7,529,231 | B2 | 5/2009 | Soo |
| 7,796,578 | B2 | 9/2010 | Stafford |
| 7,974,295 | B2 | 7/2011 | Tuohino et al. |
| 7,996,541 | B2 | 8/2011 | Marathe et al. |
| 8,010,793 | B2 | 8/2011 | Hoshino et al. |
| 9,015,327 | B2 * | 4/2015 | Naidu ................ H04L 65/1016 709/227 |
| 2003/0074461 | A1 | 4/2003 | Kang et al. |
| 2004/0068584 | A1 | 4/2004 | Costa-Requena et al. |
| 2004/0246965 | A1 | 12/2004 | Westman et al. |
| 2005/0027867 | A1 | 2/2005 | Mueller et al. |
| 2005/0286531 | A1 | 12/2005 | Tuohino |
| 2006/0029044 | A1 | 2/2006 | Kobayashi et al. |
| 2006/0098621 | A1 | 5/2006 | Plata Andres et al. |
| 2007/0150611 | A1 | 6/2007 | Chan et al. |
| 2008/0019356 | A1 | 1/2008 | Marsico |
| 2009/0010250 | A1 | 1/2009 | Ganesan et al. |
| 2009/0161666 | A1 | 6/2009 | Ku |
| 2009/0257429 | A1 | 10/2009 | Osborn et al. |
| 2010/0040048 | A1 | 2/2010 | Vormisto |
| 2011/0158236 | A1 | 6/2011 | Siegel et al. |
| 2011/0161505 | A1 | 6/2011 | Siegel et al. |
| 2011/0182287 | A1 | 7/2011 | Ku |
| 2011/0216762 | A1 | 9/2011 | Nas |
| 2012/0082158 | A1 | 4/2012 | Reddy et al. |
| 2012/0106542 | A1 | 5/2012 | Inoue |
| 2013/0036307 | A1 | 2/2013 | Gagliano et al. |
| 2013/0044644 | A1 | 2/2013 | Ku et al. |
| 2013/0132593 | A1 | 5/2013 | Westman et al. |
| 2013/0201999 | A1 | 8/2013 | Savolainen et al. |

OTHER PUBLICATIONS

Schulzrinne, et al., "The Session Initiation Protocol (SIP)", Columbia University, Dept. of Computer Science, May 2001, 137 pages.

* cited by examiner

APPARATUS AND METHODS FOR FLEXIBLE COMMUNICATIONS IN A NETWORK

CROSS-REFERENCE TO RELATED APPLICATIONS

This application is a continuation of and claims priority to U.S. patent application Ser. No. 13/493,521, filed Jun. 11, 2012, the disclosure of which is incorporated herein by reference in its entirety.

FIELD OF THE DISCLOSURE

The subject relates generally to telecommunications and more specifically to an apparatus and methods flexible communications in a network.

BACKGROUND

As communications technology improves and demand for communication services grows, providers often seek to adjust those systems to incorporate the improved technology and expand those systems to accommodate the growing demand. Systems that are slow to adjust or expand can be undesirable and are often rendered obsolete. Systems that expand by providing unnecessary redundancy are inefficient and costly. Advances in telecommunication technologies create opportunities for integrating communication capabilities as well as challenges for transitioning between technological generations

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for initiation of voice and messaging communications in a network. Other embodiments are contemplated by the subject disclosure.

One embodiment of the subject disclosure includes a method that can include receiving, at a terminating call session control function (CSCF) server associated with a terminating communication device, a session initiation protocol (SIP) invitation message including a fully qualified domain name (FQDN) for identifying an originating communication device. The method can include transmitting, by the terminating CSCF server, an A type query and an AAAA type query associated with the FQDN to a domain naming server (DNS) server responsive to receiving the SIP invitation message. The A type query can correspond to a query for an IP Version 4 (IPv4) address, and the AAAA type query can correspond to an IP Version 6 (IPv6) address. The method can further include transmitting, by the DNS server, to the terminating CSCF server at least one answer associated with at least one of the A type query or the AAAA type query. The at least one answer can include at least one of an IPv4 address or an IPv6 address. In turn, the method can include transmitting, by the terminating CSCF server, a response message to the originating communication device. The response message can include at least one of the IPv4 address or the IPv6 address associated with the at least one answer.

One embodiment of the subject disclosure includes a device having a memory storing computer instructions and a processor coupled to the memory. The processor, responsive to executing the computer instructions, can perform operations for receiving a session initiation protocol (SIP) invitation message including a fully qualified domain name for identifying an originating communication device. The processor can perform operations for transmitting a first query and a second query associated with the fully qualified domain name to a domain naming server responsive to receiving the session initiation protocol invitation message. The processor can further perform operations for receiving at least one answer from the domain naming server. The at least one answer can include at least one of a first internet protocol address conforming to a first internet protocol format or a second internet protocol address conforming to a second internet protocol format. In turn, the processor can perform operations for transmitting a response message to the originating communication device, wherein the message includes information associated with the at least one answer.

One embodiment of the subject disclosure includes a computer-readable storage medium, including computer instructions, which when executed by at least one processor cause the at least one processor to perform operations for transmitting a first query to a domain naming server responsive to receiving a session initiation protocol message including a fully qualified domain name. The first query can include one of an internet protocol version 4 address query or an internet protocol version 6 address query associated with the fully qualified domain name. The at least one processor can perform operations for receiving at least one answer from the domain naming server. The at least one answer can include at least one of an internet protocol version 4 address having no errors, a second internet protocol version 6 address having no errors, or both. In turn, the at least one processor can perform operation for transmitting a message to a communication device, wherein the message comprises information associated with the at least one answer.

Figure 1:
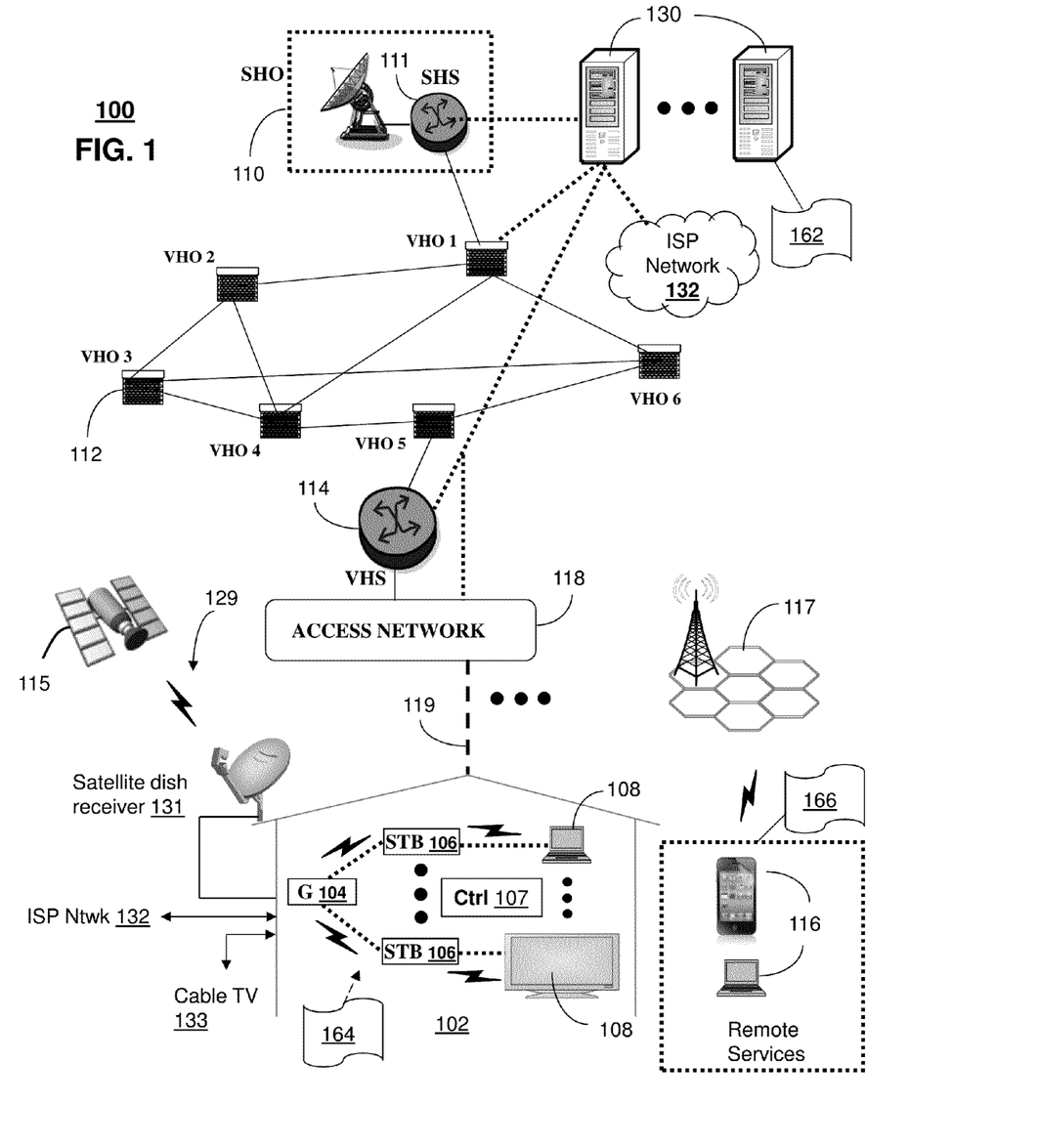
FIGS. 1-2 depict illustrative embodiments of communication systems that provide media services and that perform initiation of voice and messaging communications in a network.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services. It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a subscriber server. The subscriber server 130 can use computing and communication technology to perform function 162, which can include, among other things, providing, obtaining, and/or assigning fully qualified domain names (FQDN) for use in telephony communications by subscriber communication devices 116 of the communications system 100. A FQDN, or absolute domain name, can be a domain name that can specify an exact location within a tree hierarchy of a domain naming server (DNS). A FQDN for a network device can be provided to a DNS, which can unambiguously interpret and resolve the FQDN. In turn, the DNS can search a database and return an address, or a series of addresses, for the network device. In one embodiment, the subscriber server 130 can provide, obtain, and/or assign a unique FQDN for each communication device 116 in the communications system 100. In one embodiment, the subscriber server 130 can provide, obtain, and/or assign the unique FQDN to a DNS service for dissemination on one or more DNS devices.

In one embodiment, the subscriber server 130 can provide, obtain, and/or assign unique addresses to the communication devices 116 of the communication system 100. Each address can conform to an addressing scheme or protocol. In one embodiment, each address can conform to an internet protocol (IP) specification. For example, the addresses can be configured to conform to IP version 4 (IPv4), which is the fourth version in the development of the IP. In another example, the addresses can be configured to conform to IP version 6 (IPv6). Generally, IPv4 addressing is characterized by its use of 32-bit (four byte) addresses. The 32-bit addresses can unduly limit the number of unique addresses. IPv6 includes 128-bit (16 byte) addresses, which facilitate the creation of a much larger number of unique addresses.

In one embodiment, some of the communication devices 116 of the communication network 100 can be configured for IP v4 addressing while other communication device 116 are configured for IPv6 addressing. In one embodiment, the communication devices 116 of the communication system 100 can be configured to communicate with other communication devices of other networks, where there are different address protocols (IPv4 and IPv6) among the devices and networks, yet these must inter-communicate seamlessly.

In one embodiment, where the subscriber server 130 provides FQDNs to communication devices 116 in the communication network 100, these FQDNs can be used as a basis for querying one or more DNS device, not shown, for addresses. In one embodiment, a communication device 116 of the communication network 100 can be addressed and messaged by a second device of a second network by querying a DNS device for a unique address (IPv4 or IPv6) of the communication device 116 as referenced by the FQDN of the communication device 116. The media processors 106 and wireless communication devices 116 of the communication network 100 can be adapted with software functions 164 and 166, respectively, to utilize the services of subscriber server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
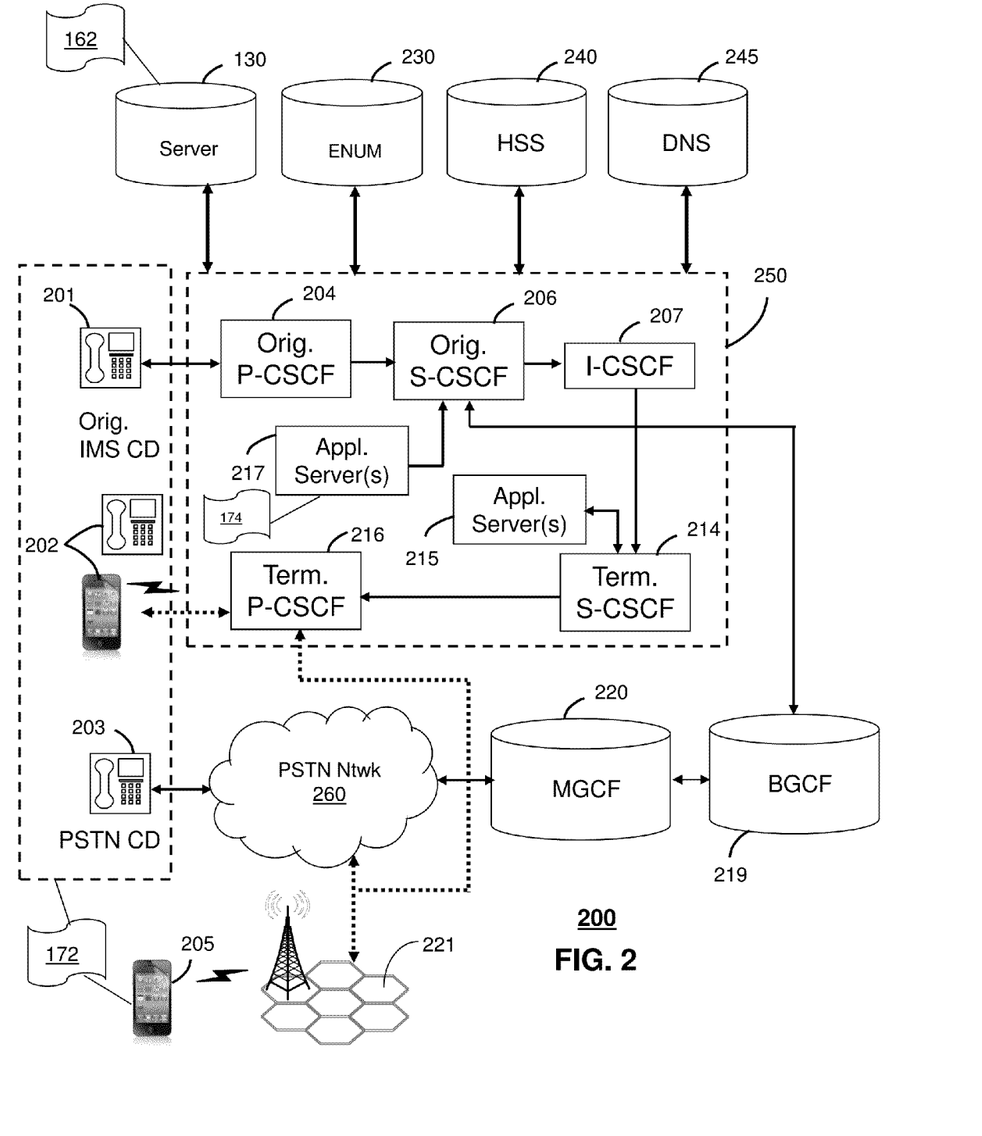

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

In one embodiment, CDs 201-203, 205 or communication servers 204, 206-217, can be configured for addressing by IPv4 protocol or by IPv6 protocol or by either IPv4 or IPv6 protocols (where a device is configured for dual stack capability). For example, some of the devices in the IMS network 250 can be configured for addressing via the IPv4 protocol, some via the IPv6 protocol, and some via either protocol. Addressing protocol differences between devices could be handled, for example, by embedding an address (32 bits for IPv4 or 128 bits for IPv6) in a connection information field of a session protocol initiation (SIP) invitation message. However, each SIP message would be required to support this overhead, and each device receiving the message would be required to parse and analyze the connection information field to determine a correct address protocol for subsequent communications. And, where a device is dual stack capable, a SIP invitation for this device would be required to carry both addresses and sustain a large penalty in overhead.

In one embodiment, a first CD 201, or originating CD, can originate a call session with a second CD 205, or terminating CD. The originating CD 201 can issue a SIP INVITE message to the originating proxy CSCF 204. The SIP INVITE message can include, for example, the telephone number of the terminating CD 205 for the requested call session. In addition, the SIP INVITE can include a fully qualified domain name (FQDN) that has been assigned to the originating CD 201. The proxy CSCF 204 can forward the SIP INVITE message to an originating CSCF 206 for connection to a terminating CSCF 214 that can, in turn, establish the call session with the correct terminating CD 205. In one embodiment, the originating CSCF 206 can query an ENUM server 230, based on the e.164 telephone number of the terminating CD 205, to request a uniform resource identifier (URI) for the terminating CD 205. In turn, the originating CSCF 206 can utilize an interrogating CSCF 207 to query an HSS 240, based in this URI, for the identity of the terminating CSCF 214 capable of completing the call session. In one embodiment, the originating CSCF 206 can transmit a SIP INVITE to the correct, terminating CSCF 214, including the URI of the terminating CD 205 and the FQDN of the originating device 201.

In one embodiment, the terminating CSCF 214 can query a DNS 245 to request the IP address of the originating CD 201. As described above, the originating CD 201 can be configured to communicate on the IMS system 250 via any of several IP protocols or versions of IP protocols. In one embodiment, the originating CD can be configured to operate via the IPv4 protocol via 32-bit addressing. In one embodiment, the originating CD 201 can be configured to operate with IPv6 protocol via 128 bit addressing. In one embodiment, the originating CD 201 can be configured as a dual stack device and can operate at either IPv4 of IPv6 protocol addressing as directed by the terminating CSCF 214.

In one embodiment, the terminating CSCF 214 can query the DNS 245 using a "A type" query, An "A type" query is a request for a DNS 245 to search its database for an IPv4 (32 bit) IP address corresponding to a provided domain name. In one embodiment, the terminating CSCF 214 can provide the FQDN of the originating device 201 to the DNS 245 with an "A type" request for the DNS 245 to search its database for an IPv4 address corresponding to that FQDN. If the DNS 245 finds the IPv4 protocol address, then the DNS can return the IPv4 address with an indicator of NO ERROR. If it cannot find the IPv4 address, as would be the case if the originating device 201 was not properly registered or the FQDN was defective or the originating device 205 was configured to use the IPv6 protocol rather than the IPv4 protocol, then the DNS can return an indicator of ERROR. In one embodiment, the terminating CSCF 214 can solely rely on the "A type" query to retrieve the actual IP address of the originating device 201 for completing the call session. Upon receipt of an ERROR reply, the terminating CSCF 214 can perform error processing, such as requesting a new FQDN from the originating CSCF 206. In another embodiment, the terminating CSCF 214 can respond to an error indication resulting from an "A type" query by requesting a second search by the DNS 245 of its database using an "AAAA type" query. In one embodiment, the terminating CSCF 214 can send a message to the originating CD 201 to initiate the call session according to the IPv4 address that was returned from the DNS 245 without error.

In an "AAAA type" query, the DNS searches its database for an IPv6 address (128 bit) corresponding the provided domain name. In one embodiment, the terminating CSCF 214 can provide the FQDN of the originating device 201 to the DNS 245 with an "AAAA type" request for the DNS 245 to search its database for an IPv6 address corresponding to that FQDN. If the DNS 245 finds the IPv6 protocol address, then the DNS can return the IPv6 address with an indicator of NO ERROR. If it cannot find the IPv6 address, as would be the case if the originating device 201 was not properly registered or the FQDN was defective or the originating device 205 was configured to use the IPv4 protocol rather than the IPv6 protocol, then the DNS can return an indicator of ERROR. In one embodiment, the terminating CSCF 214 can simply rely on the "AAAA type" query to retrieve the actual IP address of the originating device 201 for completing the call session. In one embodiment, the terminating CSCF 214 can solely rely on an "AAAA type" query to retrieve the actual IP address of the originating device 201 for completing the call session. That is, the terminating CSCF 214 can request only an "AAAA type" query and, upon receipt of an ERROR reply, perform error processing, such as requesting a new FQDN from the originating CSCF 206. In another embodiment, the terminating CSCF 214 can request an "AAAA type" query first and then respond to an error indication resulting from an "AAAA type" query by requesting a second search by the DNS 245 of its database using an "A type" query. In one embodiment, the terminating CSCF 214 can send a message to the originating CD 201 to initiate the call session according to the IPv6 address that was returned from the DNS 245 without error.

In one embodiment, the terminating CSCF 214 can request a single search that combines an "A type" query and an "AAAA type" query. That is, the terminating CSCF 214 can request that the DNS 245 perform a search of its database for both an IPv4 address corresponding to the provided FQDN and an IPv6 address corresponding to the provided FQDN. In one embodiment, the "A type" query and "AAAA type" query can be combined into a single search command. In one embodiment, the "A type" query and "AAAA type" query can be a series of two commands directed to "A type" query and the "AAAA type" query as independent, but back-to-back queries. In one embodiment, the DNS 245 return a response to the terminating CSCF 214 of ERROR for the combined query. In this case, neither search was successful. For example, if an invalid or unregistered FQDN is provided, then the DNS can reply with ERROR. If the DNS 245 finds the IPv4 protocol address, then the DNS can return the IPv4 address with an indicator of NO ERROR. If the DNS 245 finds the IPv6 protocol address, then the DNS can return the IPv6 address with an indicator of NO ERROR. In one embodiment, the DNS 245 can find both the IPv4 address and the IPv6 address and can return both the IPv4 and IPv6 addresses with an indicator of no error. In one embodiment, the DNS 245 can find only one address or the other address and can return an ERROR indicator for the undiscovered protocol type.

In one embodiment, the terminating CSCF 214 can send a message to the originating CD 201 to initiate the call session based on the IPv4 address returned from the DNS 245 without error. In another embodiment, the terminating CSCF 214 can send a message to the originating CD 201 to initiate the call session based on the IPv6 address returned from the DNS 245 without error. In another embodiment, where the DNS 245 returns both the IPv4 and IPv6 addresses without error, then the terminating CSCF 214 can determine which addressing protocol to use to address the originating CD 201.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The subscriber server 130 of FIG. 1 can be operably coupled to the second communication system 200 for purposes similar to those described above. It is further contemplated by the subject disclosure that the subscriber server 130 can perform function 162 and thereby provide NAPTRs for use in telephony communications involving the CDs 201, 202, 203 and 205 of FIG. 2. CDs 201, 202, 203 and 205, which can be adapted with software to perform function 172 to utilize the services of the subscriber server 130. It is further contemplated that the subscriber server 130 can be an integral part of the application server(s) 217 performing function 174, which can be substantially similar to function 162 and adapted to the operations of the IMS network 250.

Figure 3:
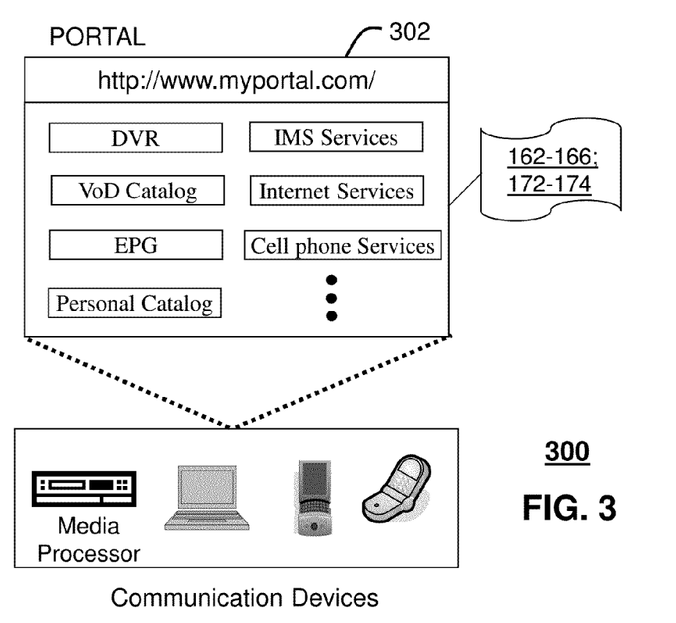
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174 to adapt these applications as may be desired by subscribers and service providers of communication systems 100-200.

Figure 4:
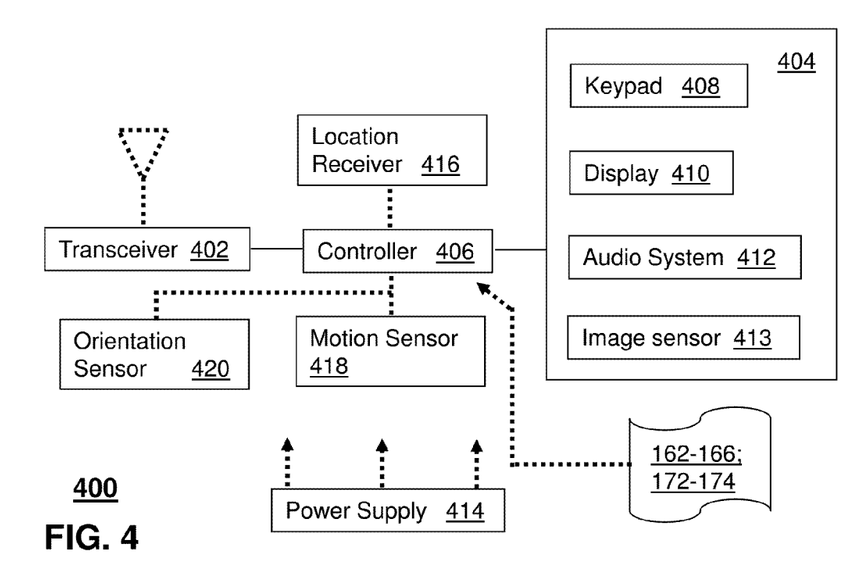
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, respectively.

Figure 5:
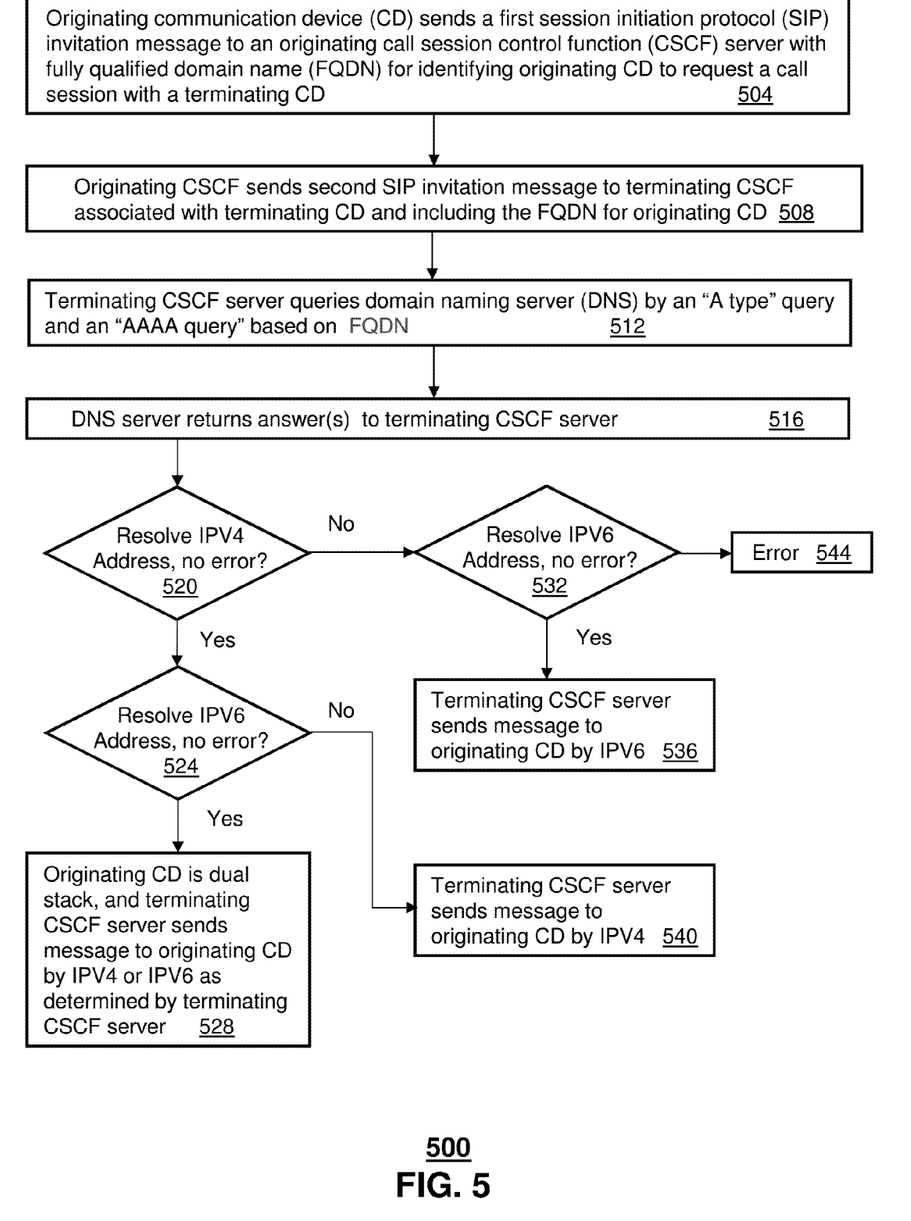
FIGS. 5-7 depict an illustrative embodiments of methods operating in portions of the systems described in FIGS. 1-4.

FIG. 5 depicts an illustrative method 500 that operates in portions of the devices of FIGS. 1-4. Method 500 can begin with step 504 in which, an originating communication device (CD) 201 can send a first session initiation protocol (SIP) invitation (INVITE) message to an originating call session control function (CSCF) server 206 for requesting a call session with a terminating CD 205. In one embodiment, the originating CD 201 can request the call session without a SIP INVITE message. In one embodiment, the SIP INVITE can include a fully qualified domain name (FQDN) that has been assigned to the originating CD 201. In one embodiment, the FQDN is provisioned to the CD 201 from a subscriber serve 130 of the communication system 100, 200. In another embodiment, the subscriber server 130, or its functionality, is incorporated into the HSS 240. In another embodiment, the originating CSCF server 206, or its functionality, is incorporated into the originating CD 201.

In step 508, the originating CSCF server 206 can send a second SIP INVITE message to a terminating CSCF server 214 associated with the terminating CD 205. In one embodiment, the second SIP INVITE message includes the FQDN for the originating device 201. In one embodiment, the originating CD 201 does not send the FQDN to the originating CSCF server 206, rather, the CSCF server 206 can deduce, lookup, or otherwise provide the FQDN for the originating CD 201 based on a local database or configuration.

In step 512, the terminating CSCF 214 can query a domain naming server (DNS) 245 based on the FQDN that it has received. In one embodiment, the CSCF 214, or its functionality, can be incorporated into the terminating CD 205. In one embodiment, the terminating CSCF 214 can search the DNS 245 based on an "A type" query and an "AAAA type" query. In one embodiment, the terminating CSCF 214 can request that the DNS 245 perform a search of its database for both an IPv4 address corresponding to the provided FQDN and an IPv6 address corresponding to the provided FQDN. In one embodiment, the "A type" query and "AAAA type" query can be combined into a single search command. In one embodiment, the "A type" query and "AAAA type" query can be a series of two commands directed to "A type" query and the "AAAA type" query as independent, but back-to-back queries.

In step 516, the DNS 245 can return one or more answers of the query to the terminating CSCF server 214. In one embodiment, the DNS 245 return a response to the terminating CSCF 214 of ERROR for the combined query. In this case, neither search was successful. For example, if an invalid or unregistered FQDN is provided, then the DNS can reply with ERROR. If the DNS 245 finds the IPv4 protocol address, then the DNS can return the IPv4 address with an indicator of NO ERROR. If the DNS 245 finds the IPv6 protocol address, then the DNS can return the IPv6 address with an indicator of NO ERROR. In one embodiment, the DNS 245 can find both the IPv4 address and the IPv6 address and can return both the IPv4 and IPv6 addresses with an indicator of no error. In one embodiment, the DNS 245 can find only one address or the other address and can return an ERROR indicator for the undiscovered protocol type.

In step 520, the terminating CSCF server 214 can determine if the DNS returned the IPv4 address with an indicator of NO ERROR. If so, then, the terminating CSCF server 214 can further determine if the DNS returned the IPv6 address with NO ERROR in step 524 or can, similarly, determine if the DNS returned the IPv6 address with NO ERROR in step 532. In both the IPv4 and IPv6 addresses were returned without error in steps 520 and 524, then, in step 528, the terminating CSCF 214 can send a message to the originating CD 201 to initiate the call session based on the IPv4 address or based on the IPv6 address as determined by the terminating CSCF server 214. If the IPv4 address is not returned or indicates an error, but the IPv6 address is returned without error, as determined in step 532, then the terminating CSCF server 214 can send a message to the originating CD 201 to initiate the call session based on the IPv6 address in step 536. If the IPv6 address is not returned or indicates an error, but the IPv4 address is returned without error, as determined in step 524, then the terminating CSCF server 214 can send a message to the originating CD 201 to initiate the call session based on the IPv4 address in step 540. In the IPv4 address and the IPv6 address are not returned without error, as determined in step 532, then the terminating CSCF server 514 processes the error in step 544.

Figure 6:
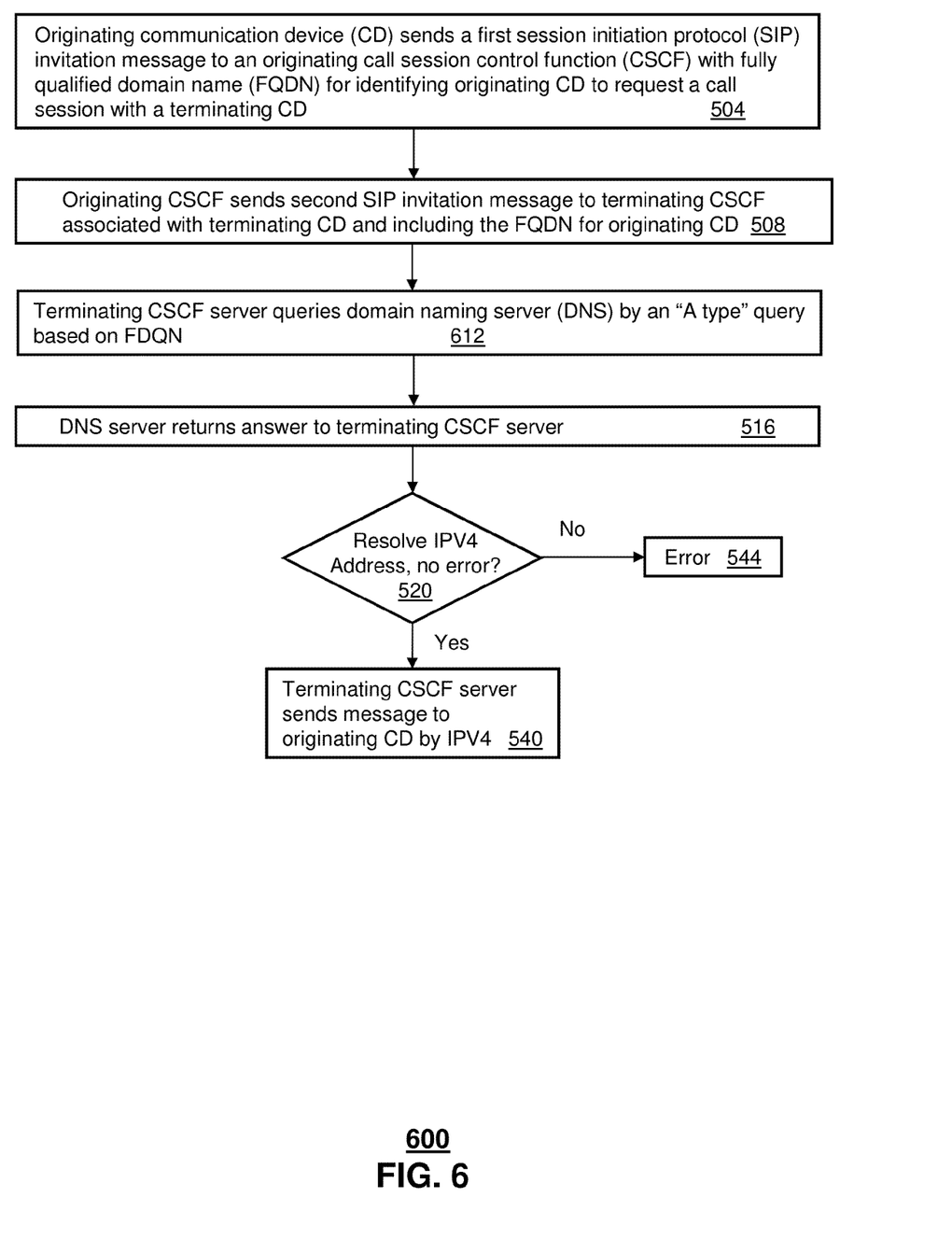

FIG. 6 depicts an illustrative method 600 that operates in portions of the devices of FIGS. 1-4. Method 600 can begin with steps 504 and 508, in which, as in FIG. 5, the originating communication device (CD) 201 can send a first session initiation protocol (SIP) invitation (INVITE) message to an originating call session control function (CSCF) server 206 for requesting a call session with a terminating CD 205 and the originating CSCF server 206 can send a second SIP INVITE message to a terminating CSCF server 214 associated with the terminating CD 205. In step 612, the terminating CSCF 214 can query a domain naming server (DNS) 245 based on the FQDN that it has received. However, the terminating CSCF 214 can search the DNS 245 only based on an "A type" query.

In step 516, the DNS 245 can return one or more answers of the query to the terminating CSCF server 214. In step 520, the terminating CSCF server 214 can determine if the DNS returned the IPv4 address with an indicator of NO ERROR. If so, then, the terminating CSCF server 214 can send a message to the originating CD 201 to initiate the call session based on the IPv4 address in step 540. If the IPv4 address is not returned without error, as determined in step 520, then the terminating CSCF server 514 processes the error in step 544.

Figure 7:
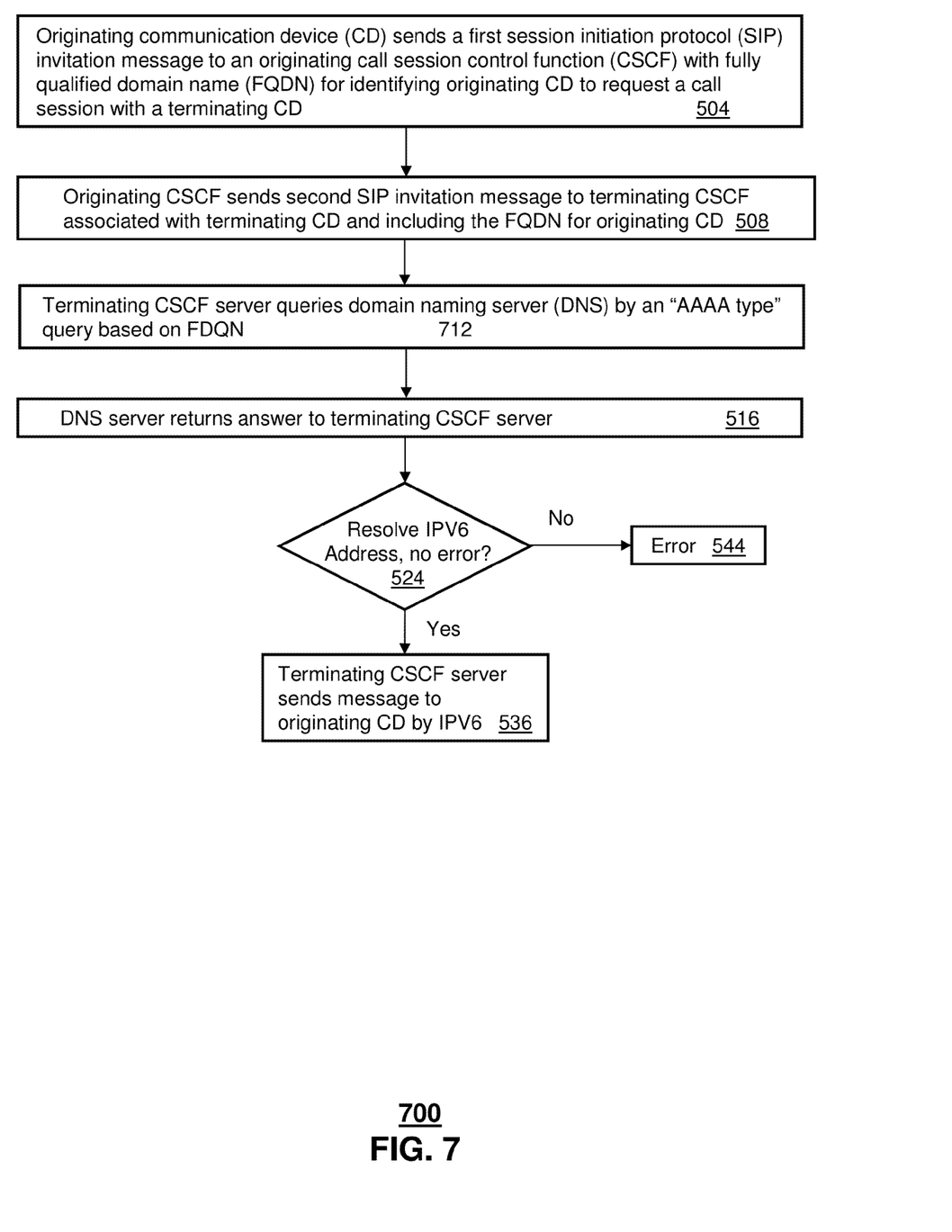

FIG. 7 depicts an illustrative method 700 that operates in portions of the devices of FIGS. 1-4. Method 700 can begin with steps 504 and 508, in which, as in FIG. 5, the originating communication device (CD) 201 can send a first session initiation protocol (SIP) invitation (INVITE) message to an originating call session control function (CSCF) server 206 for requesting a call session with a terminating CD 205 and the originating CSCF server 206 can send a second SIP INVITE message to a terminating CSCF server 214 associated with the terminating CD 205. In step 712, the terminating CSCF 214 can query a domain naming server (DNS) 245 based on the FQDN that it has received. However, the terminating CSCF 214 can search the DNS 245 only based on an "AAAA type" query.

In step 516, the DNS 245 can return one or more answers of the query to the terminating CSCF server 214. In step 524, the terminating CSCF server 214 can determine if the DNS returned the IPv6 address with an indicator of NO ERROR. If so, then, the terminating CSCF server 214 can send a message to the originating CD 201 to initiate the call session based on the IPv6 address in step 536. If the IPv6 address is not returned without error, as determined in step 524, then the terminating CSCF server 514 processes the error in step 544.

Upon reviewing the aforementioned embodiments, it would be evident to an artisan with ordinary skill in the art that said embodiments can be modified, reduced, or enhanced without departing from the scope and spirit of the claims described below. For example, the FQDN for the originating device can be stored in the HSS 240. In one embodiment, the originating device 201 can be identified in the SIP INVITE message by an e.164 telephone number or by a URI. When the originating CSCF server 206 requests the interrogating the CSCF server 207 to request the identity of the terminating CSCF server 214 from the HSS 240, the interrogating CSCF server 207 can further request the FQDN from the HSS 240 based on the e.164 telephone number or the URI.

In another embodiment, the terminating CSCF server 514 can be identified by the HSS 240 using a FQDN. For example, the HSS 240 can return a FQDN for the terminating CSCF server 514 in response to the query by the interrogating CSCF server 207.

Figure 8:
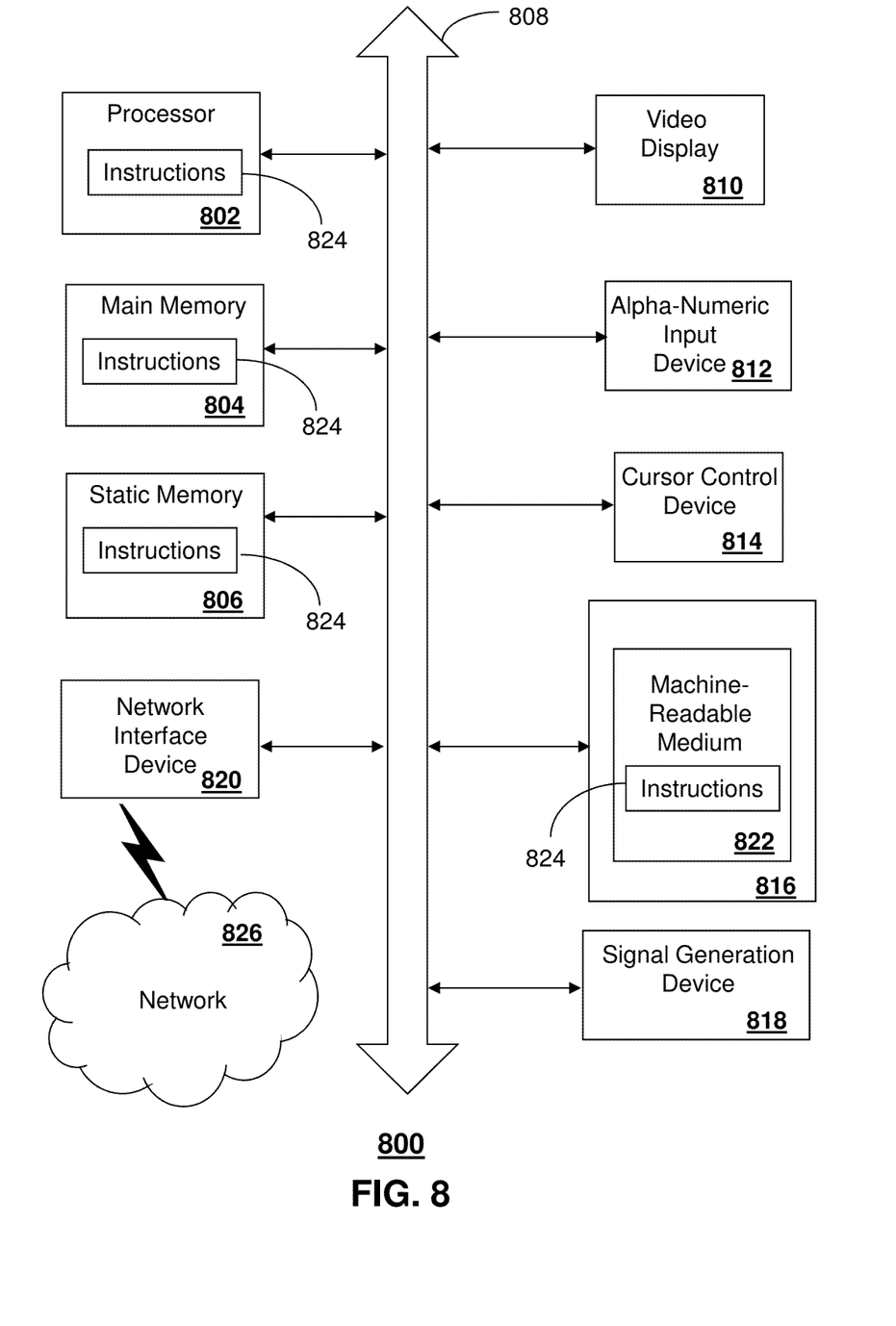
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the subscriber server 130, media processor 106, CDs 201-205, originating CSCF 206, terminating CSCF 214, HSS 240, ENUM server 230, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a server comprising a processor, a request from a calling device for a call session with a terminating device over a communication network, wherein the request includes a fully qualified domain name identifying the calling device;
   transmitting to a domain naming server, by the server, a query comprising the fully qualified domain name;
   receiving, by the server, a response from the domain naming server;
   analyzing, by the server, the response that is received to determine an answer combination;
   transmitting to the calling device, by the server, a first response message via an internet protocol version 4 address if the answer combination comprises the internet protocol version 4 address with a first non-error indicator and an internet protocol version 6 address with a first error indicator; and
   transmitting to the calling device, by the server, a second response message via the internet protocol version 6 address if the answer combination comprises the internet protocol version 4 address with a second error indicator and the internet protocol version 6 address with a second non-error indicator.

2. The method of claim 1, further comprising determining, by the server, that the calling device comprises a dual stack capability if the answer combination comprises the internet protocol version 4 address with the first non-error indicator and the internet protocol version 6 address with the second non-error indicator.

3. The method of claim 1, wherein the fully qualified domain name is accessed according to a telephone number that is associated with the calling device.

4. The method of claim 1, further comprising:
   transmitting, by the server, a second request to a home subscriber server for a second fully qualified domain name that is associated with the calling device; and
   receiving, by the server, the second fully qualified domain name from the home subscriber server.

5. The method of claim 1, wherein the request comprises a session initiation protocol initiation message that does not utilize addressing that conforms to internet protocol version 4 or internet protocol version 6.

6. The method of claim 1, comprising determining by a configuration whether the response message comprises the internet protocol version 4 address or the internet protocol version 6 address.

7. The method of claim 1, wherein the calling device is enabled for dual stack internet protocol addressing.

8. A device, comprising:
   a memory storing executable instructions; and
   a processor coupled to the memory, wherein the executable instructions facilitate performance of operations comprising:
   receiving a query from a terminating call session control function server, wherein the query comprises a fully qualified domain name associated with a calling device, and wherein the query is received responsive to the terminating call session control function receiving a request from an originating call session control function server for a call session for the calling device and a terminating device over a communication network; and
   transmitting an answer to the terminating call session control function server responsive to the query, wherein the answer comprises one of an internet protocol version 4 address with a first error indicator, an internet protocol version 6 address with a second error indicator, or a combination thereof, wherein the answer is analyzed by the terminating call session control function server to determine an answer combination according to a combination of the first error indicator and the second error indicator, and wherein a response is transmitted by the terminating call session control function server to the calling device via one of the internet protocol version 4 address or the internet protocol version 6 address according to the answer combination that is determined.

9. The device of claim 8, wherein the query comprises an A type query and an AAAA type query based on the fully qualified domain name.

10. The device of claim 8, wherein the terminating call session control function server transmits the response via the internet protocol version 4 address if the answer combination comprises the internet protocol version 4 address with a first non-error indicator and the internet protocol version 6 address with a first error indicator.

11. The device of claim 8, wherein the terminating call session control function server transmits the response via the internet protocol version 4 address if the answer combination comprises the internet protocol version 4 address with a first error indicator and the internet protocol version 6 address with a first non-error indicator.

12. The device of claim 8, wherein the terminating call session control function server determines that the calling device is a dual stack device if the answer combination comprises the internet protocol version 4 address with a first non-error indicator and the internet protocol version 6 address with a second non-error indicator.

13. The device of claim 8, wherein the calling device is enabled for dual stack internet protocol addressing.

14. The device of claim 8, wherein the terminating call session control function utilizes an addressing protocol that differs from the addressing protocol utilized by the calling device.

15. A mobile communication device, comprising:
a memory storing executable instructions; and
a processor coupled to the memory, wherein the executable instructions facilitate performance of operations comprising:
transmitting a request to an originating call session control function server for a call session with a terminating device over a communication network, wherein the request comprises a fully qualified domain name for identifying the mobile communication device, and wherein a notification is sent from the originating call session control function server to a termination call session control function server responsive to the request; and
receiving, from an terminating call session control function server, a response message via an internet protocol version 4 address or an internet protocol version 6 address according to an answer combination, wherein a query is transmitted from the terminating call session control function server to a domain naming server according to the fully qualified domain name, wherein an answer from the domain naming server is received by the terminating call session control function server, wherein the answer is analyzed by the terminating call session control function server to determine an answer combination according to the answer.

16. The device of claim 15, wherein the call session comprises a packet-switched communication session.

17. The device of claim 15, wherein request comprises a session initiation protocol message.

18. The device of claim 15, wherein the terminating call session control function server transmits the response message via the internet protocol version 4 address if the answer combination comprises the internet protocol version 4 address with a first non-error indicator and the internet protocol version 6 address with a first error indicator.

19. The device of claim 15, wherein the terminating call session control function server transmits the response message via the internet protocol version 4 address if the answer combination comprises the internet protocol version 4 address with a first error indicator and the internet protocol version 6 address with a first non-error indicator.

20. The device of claim 15, wherein the terminating call session control function server determines that the mobile communication device comprises a dual stack addressing capability if the answer combination comprises the internet protocol version 4 address with a first non-error indicator and the internet protocol version 6 address with a second non-error indicator.

* * * * *